(12) United States Patent
Chuang

(10) Patent No.: US 7,043,376 B2
(45) Date of Patent: May 9, 2006

(54) VIBRATION MEASUREMENT APPARATUS AND METHOD

(75) Inventor: Thomas H. Chuang, Longmont, CO (US)

(73) Assignee: Seagate Technology LLC, Scotts Valley, CA (US)

(*) Notice: Subject to any disclaimer, the term of this patent is extended or adjusted under 35 U.S.C. 154(b) by 0 days.

(21) Appl. No.: 10/665,784

(22) Filed: Sep. 19, 2003

(65) Prior Publication Data

US 2005/0075805 A1    Apr. 7, 2005

(51) Int. Cl.
    *G01L 7/00*    (2006.01)
(52) U.S. Cl. ........................................................ 702/56
(58) Field of Classification Search ................ 702/56, 702/77; 324/162, 166, 164; 73/660, 650, 73/655; 701/110; 348/208; 175/57, 45, 175/48; 166/65; 340/870; 367/84; 369/44; 356/504, 492, 491; 463/31; 382/154; 346/137
    See application file for complete search history.

(56) References Cited

U.S. PATENT DOCUMENTS

| 4,015,480 A | 4/1977 | Giers |
| 4,250,555 A | 2/1981 | Mitchell et al. |
| 4,502,328 A | 3/1985 | Wood et al. |
| 4,608,650 A | 8/1986 | Kapadia |
| 4,647,853 A * | 3/1987 | Cobern ........................ 324/166 |
| 4,805,125 A | 2/1989 | Beebe |
| 4,868,762 A | 9/1989 | Grim et al. |
| 4,958,125 A * | 9/1990 | Jardine et al. .............. 324/162 |
| 5,089,969 A | 2/1992 | Bradshaw et al. |
| 5,412,985 A | 5/1995 | Garcia et al. |
| 5,471,880 A * | 12/1995 | Lang et al. .................... 73/660 |
| 5,661,672 A | 8/1997 | Gnielka et al. |
| 5,955,674 A * | 9/1999 | McGovern et al. ........... 73/650 |
| 6,181,652 B1 * | 1/2001 | Katou et al. ............. 369/44.32 |
| 6,263,738 B1 | 7/2001 | Hogle |
| 6,351,714 B1 | 2/2002 | Birchmeier |
| 6,456,945 B1 | 9/2002 | Sonnichsen et al. |
| 2003/0164045 A1* | 9/2003 | Argento et al. ................ 73/655 |
| 2003/0173838 A1* | 9/2003 | Koh ............................. 310/51 |

* cited by examiner

*Primary Examiner*—Michael Nghiem
*Assistant Examiner*—Tung Lau
(74) *Attorney, Agent, or Firm*—Fellers, Snider, et al.

(57) ABSTRACT

An apparatus for measuring vibration in a article having a rotating member. A motion sensitive transducer produces a time domain analog signal in response to the vibration. An analog-to-digital data acquisition member samples the transducer signal and produces a time domain digital signal therefrom. A timing sensor is adapted to detect an instantaneous speed of the rotating member and preferably triggers the data acquisition member to begin sampling when the rotating member is rotating. A processor processes the time domain digital signal preferably by translation to a frequency domain digital signal and determination of the magnitude and phase of the frequency domain digital signal at a frequency associated with the instantaneous speed of the rotating member.

15 Claims, 5 Drawing Sheets

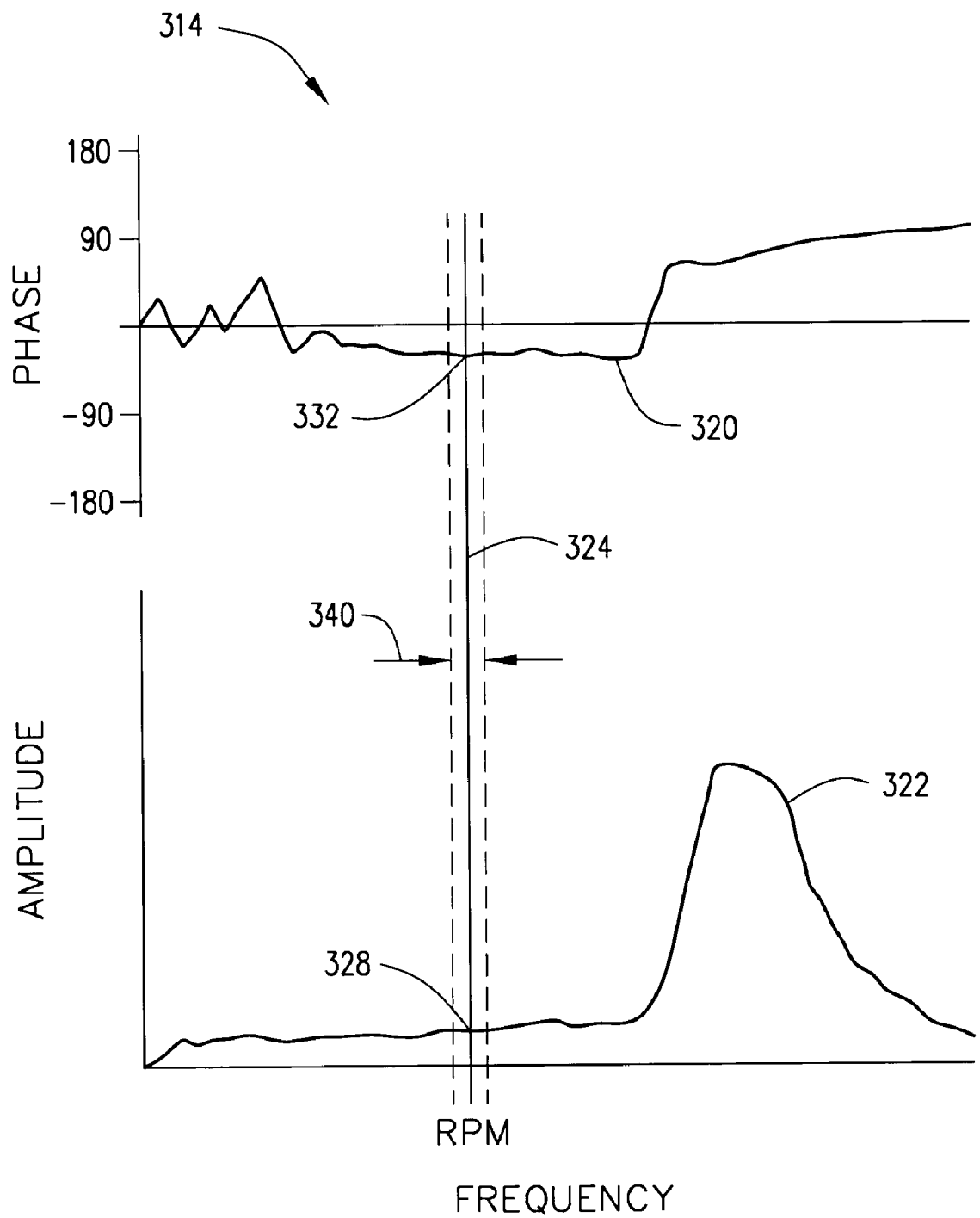
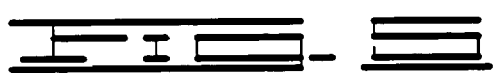

VIBRATION MEASUREMENT APPARATUS AND METHOD

FIELD OF THE INVENTION

This invention relates generally to the field of vibration measurement for a device having a rotating member and more particularly without limitation to a device and associated method for fast and accurate vibration data collection within a particular frequency associated with the rotational speed of the rotating member.

BACKGROUND OF THE INVENTION

Devices having rotating members generally require balancing in order to keep vibrations that are caused by the rotating mass below a desired level. In a rotating-disc data storage device, for example, the disc (or disc stack) typically is precision balanced. Otherwise, vibrations associated with an unbalanced condition can impair the operable data transfer relationship between the read/write head and the rotating disc.

An offsetting mass is attached to the disc stack in order to balance it. Typically, the discs are attached to the hub of a spindle motor by a clamp ring. The clamp ring itself can be fashioned to provide the offsetting mass. The amount of offsetting mass is determined by the magnitude of the imbalance condition, and the rotational orientation of the offsetting mass is determined by the phase angle of the imbalance condition. There are a number of traditional approaches used to determine the magnitude and phase angle of the imbalance condition.

In data storage device manufacturing today, one such approach utilizes a motion-sensitive transducer, such as a piezoelectric transducer, to determine the translational movement imparted to the data storage device housing by the spinning disc stack. In some solutions the analog signal from the transducer is analyzed in the time domain to determine the vibration magnitude and phase. In some solutions the analog signal is translated to a digital pulse stream to facilitate analysis in the time domain.

In any event, a problem with these traditional approaches is that they are relatively too slow to keep pace with the station cycle time of high speed manufacturing processes, which in the data storage industry can typically be about four seconds or less. A reason for the slow response is because the vibration measurements must be taken at steady-state conditions. That is, the data collection activity cannot begin until the motor has accelerated the disc stack to operational speed, and until all transient surges associated with the acceleration have dissipated.

Another problem associated with traditional approaches is that they require extensive isolation from external vibration sources. This makes it virtually impossible to perform other manufacturing operations while the data collection activity is taking place. Attaching a fastener, for example, can create vibrations that could contaminate the measurements. For this reason it is not unusual to see manufacturing lines designed with dedicated vibration testing stations.

It has been determined that by detecting the actual speed of the disc stack and using the speed to trigger data collection activity, transient data can be analyzed during the disc stack acceleration. Furthermore, by translating the analog signal from the transducer to a digital signal in the frequency domain, the vibration analysis can be focused on the frequency associated with the rotational speed of the disc stack. This prevents vibrations not associated with the rotating disc from being included in the data collection activities. These enhancements lend greater speed and accuracy to the manufacturing process, and allow performing simultaneous operations on the data storage device during vibration testing. It is to these improvements and others as exemplified by the description and appended claims that embodiments of the present invention are directed.

SUMMARY OF THE INVENTION

The embodiments of the present invention contemplate an apparatus and associated method for measuring vibration in an article having a rotating member. The device comprises a motion sensitive transducer attachable to the article comprising an output producing a time domain analog signal in response to the vibration. In one aspect the timing sensor comprises an optic sensor that is responsive to a target feature on the rotating member. The device can comprise two transducers producing simultaneous vibration signals from different planes, such as from orthogonal planes.

An analog-to-digital data acquisition member comprising an input connected to the transducer output for sampling the transducer signal and comprising an output producing a time domain digital signal from the sampling. A timing sensor is adapted to detect an instantaneous speed of the rotating member and triggers the data acquisition member to begin sampling when the rotating member is rotating. A processor comprising an input connected to the data acquisition member output for translating the time domain digital signal to a frequency domain digital signal and determining the magnitude and phase of the vibration signal at a frequency associated with the instantaneous speed of the rotating member. The device can perform a Fourier transformation in translating the signal from the time domain to the frequency domain.

The device of can further comprise a comparator determining whether the magnitude of the vibration signal at the frequency associated with the instantaneous speed of the rotating member is greater than a preselected threshold. The instantaneous speed can be associated with a transient start up state of the article's rotating member, which is less than the operating speed of the rotating member.

One aspect of the embodiments of the present invention contemplates a rotating disc data storage device balancer for measuring vibration. The balancer comprises a motion sensitive transducer attachable to the data storage device comprising an output producing a time domain analog signal in response to the vibration. The balancer can comprise two transducers producing simultaneous vibration signals along different planes, such as along orthogonal planes.

A timing sensor is adapted to detect an instantaneous speed of the disc stack. The instantaneous speed can be associated with a transient start up state of the disc and is less than the operating speed of the disc. The timing sensor can comprise an optic sensor that is responsive to a target feature on the rotating member.

The balancer is triggered to begin sampling by the timing sensor when the disc stack begins rotating. The balancer further comprises means for processing the transducer signal in determining a magnitude and phase of the signal at a frequency determined by the timing sensor.

The means for processing can be characterized by an analog-to-digital data acquisition member comprising an input connected to the transducer output for sampling the transducer signal and comprising an output producing a time domain digital signal from the sampling.

The means for processing can be characterized by a digital signal processor comprising an input connected to the data acquisition member output for translating the time domain digital signal to a frequency domain digital signal. The translation can be accomplished by a Fourier transformation.

The means for processing can be characterized by a comparator determining whether the magnitude of the vibration signal at the frequency associated with the instantaneous speed of the rotating member is greater than a preselected threshold.

One aspect of the embodiments of the present invention contemplates a method for measuring vibration in an article having a rotating member. The method comprises the following: orienting a motion-sensitive transducer on the article for detecting a vibration signal that is proportional to the article vibration along a desired direction; detecting the instantaneous speed of the rotating member; sampling and digitizing the vibration signal in obtaining a time domain digital signal of the vibration; translating the time domain digital signal to a frequency domain digital signal; and determining the magnitude and phase of the frequency domain digital signal at the frequency associated with the instantaneous speed of the rotating member.

The sampling and digitizing step can be initiated in response to the detecting step indicating a rotation of the rotating member that is greater than zero. The method can further comprise comparing the magnitude of the signal at the frequency associated with the instantaneous speed of the rotating member with a preselected threshold.

These and various other features as well as advantages which characterize the present invention will be apparent upon reading of the following detailed description and review of the associated drawings.

BRIEF DESCRIPTION OF THE DRAWINGS

FIG. 5 is a graphical representation of the frequency domain vibration analysis of the imbalance detect circuit of FIG. 2.

DETAILED DESCRIPTION

Figure 1:
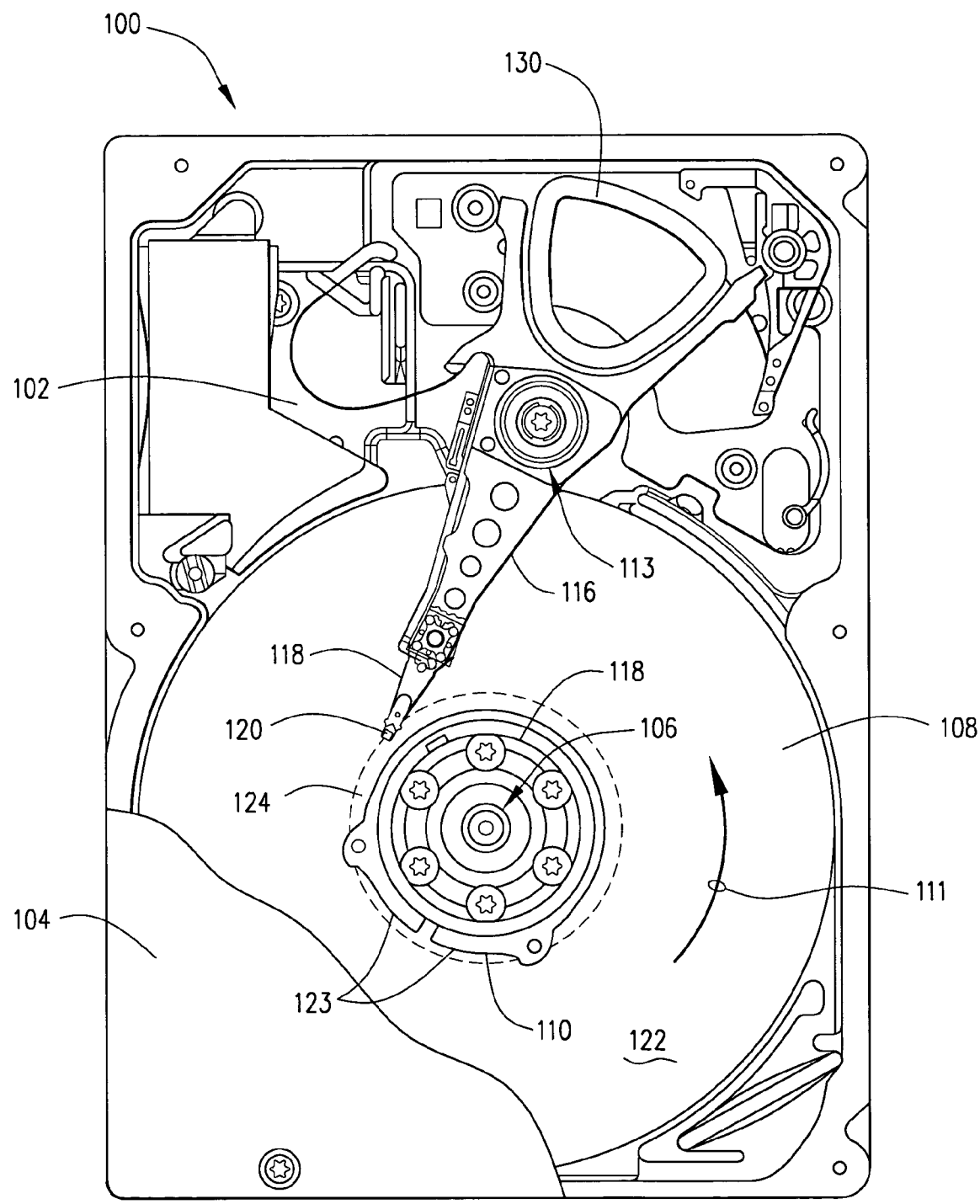
FIG. 1 is a plan view of a data storage device having a disc stack well suited for balancing in accordance with the embodiments of the present invention.

Referring to the drawings in general, and more particularly to FIG. 1, shown therein is a plan representation of a data storage disc drive 100 constructed in accordance with an embodiment of the present invention. The disc drive 100 includes a base 102 to which various components are mounted, and a cover 104 (partially cut-away) which together with the base 102 forms an enclosure providing a sealed internal environment for the disc drive 100.

Mounted to the base 102 is a motor 106 to which one or more data storage discs 108 are stacked and secured by a clamp ring 110 for rotation at a high speed in direction 111. A plurality of discs 108 can be stacked with alternating disc spacers 112 (FIG. 2) to form a disc stack. An actuator 113 pivots around a pivot bearing in a plane parallel to the discs 108. The actuator 113 has actuator arms 116 (only one shown in FIG. 1) that support load arms 118 in travel across the discs 108 as the actuator arms 116 move within the spaces between adjacent discs 108. The load arms 118 (or "flexures") are flex members that support data transfer members, such as read/write heads 120 ("heads"), with each of the heads 120 operatively interfacing one of the discs 108 in a data reading and writing relationship. Data read and write signals are transmitted from the head 120 to a preamplifier by electrical traces extending along the actuator 113.

Each of the discs 108 has a data storage region comprising a data storage surface 122 divided into concentric circular data tracks (not shown). Each of the heads 120 are positioned adjacent a desired data track to read data from or write data to the data track. A circular landing zone 124 is provided where the heads 120 can come to rest against the respective discs 108 at times when the discs 108 are not spinning. The landing zone 124 can bound the data storage surface 122 inwardly; alternatively, the landing zone 124 can be located elsewhere.

The actuator 112 is positioned by a voice coil motor (VCM) 128 comprising an electrical coil 130 and a magnetic circuit source. The magnetic circuit source comprises one or more magnets supported by magnetic poles to complete the magnetic circuit. When controlled current is passed through the actuator coil 130, an electromagnetic field is set up which interacts with the magnetic circuit, causing the actuator coil 130 to move. As the actuator coil 130 moves, the actuator 113 pivots around the pivot bearing, causing the heads 120 to travel across the discs 108 within an operable range of movement.

The motor 106 spins the discs 108 at a high speed as the head 120 reads data from and writes data to the data storage surface 122. The head 120 includes an aerodynamic slider portion (not shown), that engages the fluid flow to fly the head 120 away from the data storage surface 122 during data reading and writing operations.

Vibration caused by the rotating discs 108 can adversely affect the data reading and writing relationship between a head 120 and its respective disc 108. To keep the vibration at an operable level, the data storage device 100 typically is spin balanced during manufacturing. In doing so, the magnitude and phase angle of the imbalance condition is measured in order to determine the amount and placement of an offsetting mass that is attached to the disc stack to balance it in rotation. In the data storage device 100 of FIG. 1, the clamp 110 has a segment 123 of increased mass, thereby forming a nonconcentric mass distribution around the disc 108 axis of rotation. The amount of mass in the mass segment 123 can be varied depending upon the magnitude of the unbalance condition, and the angular placement of the mass segment 123 can be varied depending upon the phase angle of the unbalance condition. The following discusses the manner of determining this magnitude and phase angle of the unbalance condition so that a balancing process can be successfully accomplished.

Figure 2:
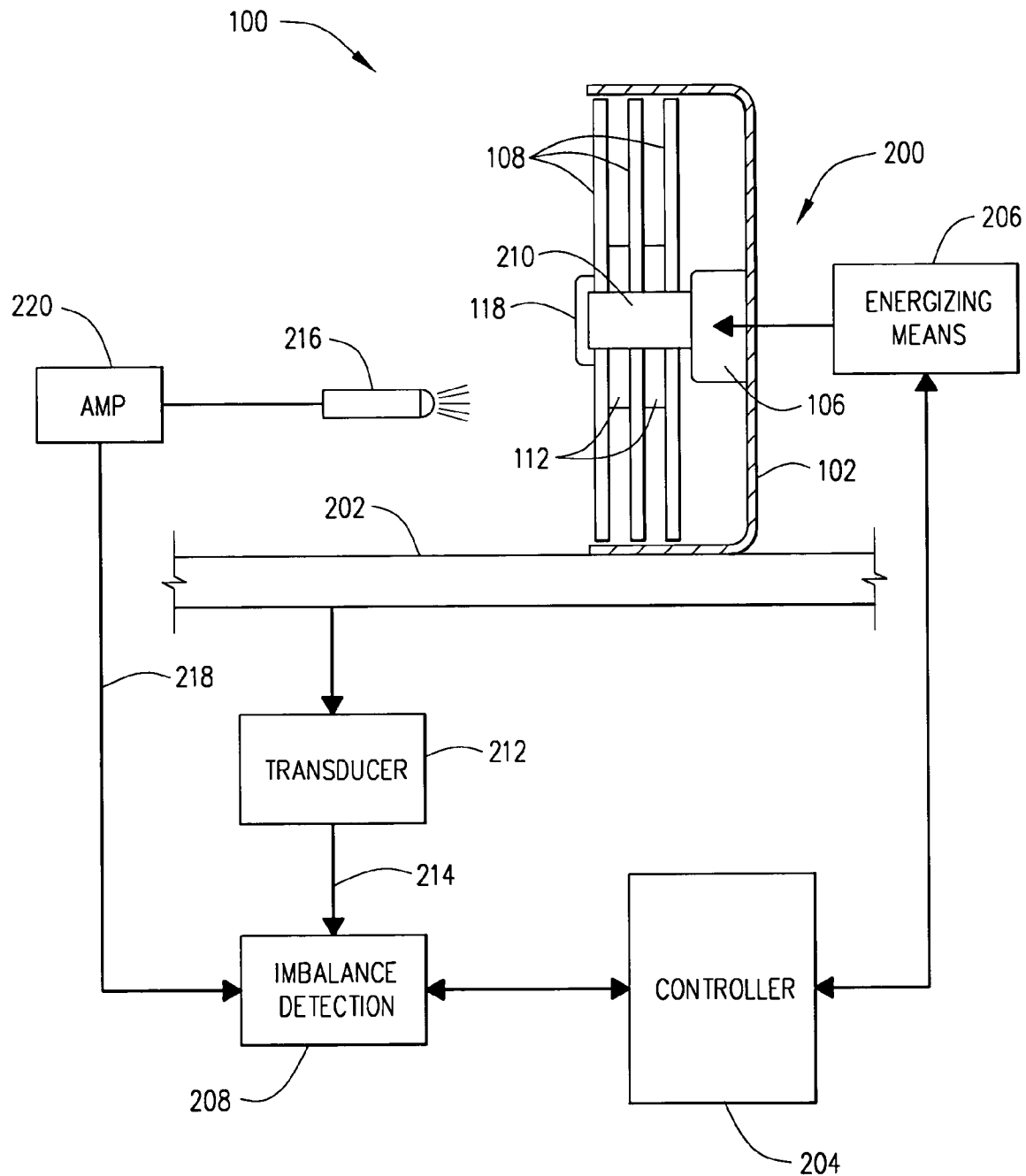
FIG. 2 is a diagrammatic view of a balancer device constructed in accordance with embodiments of the present invention.

FIG. 2 is a diagrammatic view of a balancer device 200 that is constructed in accordance with the embodiments of the present invention. The balancer device 200 has a structural fixturing block 202 (shown partially cutaway) to which the base 102 is secured. A controller 204 provides top level control of the balancer device 200 including activation of an energizing means 206 and initialization and operation of an imbalance detection circuit 208.

The energizing means 206 provides power to rotate the spindle motor 106 at a desired speed. Where the spindle motor is a multi-phase direct-current inductive type motor, then the energizing means can be electrically connectable to the spindle motor's coil terminals so as to electrically commutate the motor to rotate the hub 210 to which the discs 108 are clamped.

The imbalance detection circuit 208 is responsive to a transducer 212 that produces a time domain analog signal 214 that is proportional to vibration in the fixturing block 202 imparted by the spinning discs 108 in the data storage device 100. In an illustrative embodiment the transducer 212 can comprise a piezoelectric transducer construction. As discussed below, the data storage device 100 and the transducer 212 can be selectively positioned in order to measure the vibration along a desired direction. Alternatively, two or more transducers 212 can be used to measure vibration along multiple axes.

The imbalance detection circuit 208 is also responsive to a timing sensor 216 that sends a signal 218 indicating the rotational speed of the discs 108. The timing sensor 216 can comprise an optical transducer that emits a light beam against a selected portion of the rotating hub 210 of the spindle motor 106. An index mark, such as an aperture or void, can be disposed in the hub 210 to instantaneously vary the reflectivity sensed by the timing sensor 216 on each revolution. An amplifier 220 conditions the output from the timing sensor 216, such as providing a frequency modulated pulse to the imbalance detection circuit 208. One suitable timing sensor and amplifier is commercially available model FS-V1 from Keyence Corporation, Woodcliff Lake, N.J.

Figure 3:
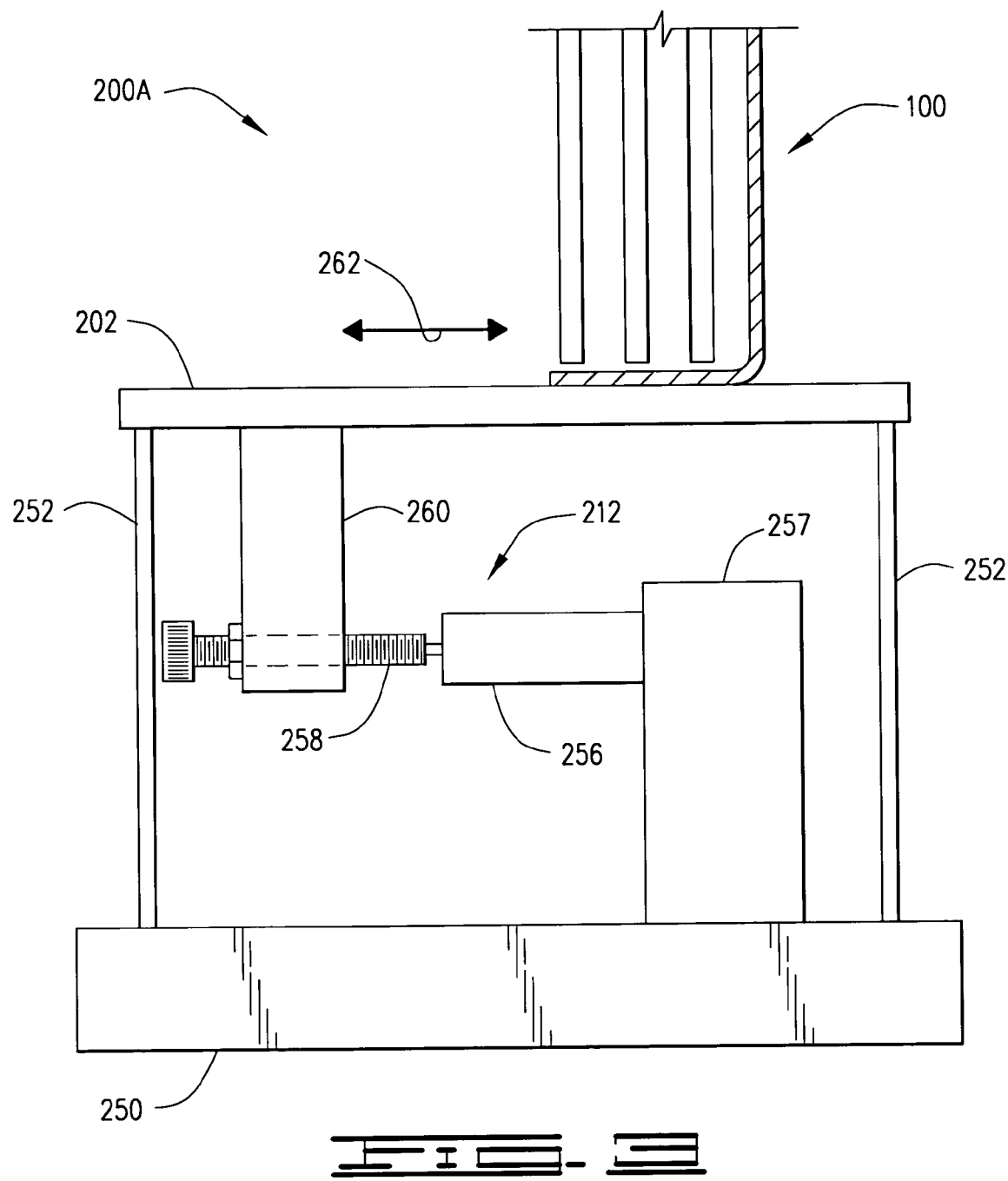
FIG. 3 is an elevational view of a portion of a balancer device constructed in accordance with embodiments of the present invention.

FIG. 3 is an elevational view of a balancer 200A constructed in accordance with the embodiments of the present invention. The data storage device 100 is fixed on edge to the fixturing plate 202, which is spatially separated from a base plate 250 by a number of upstanding column members 252. The column members 252 are fashioned of sufficiently small diameter to allow first order vibration between the fixturing plate 202 and the base plate 250. A transducer 212 has a base portion 256 supported by an upstanding member 257 depending from the base plate 250, and an actuator portion 258 supported by an upstanding member 260 depending from the fixturing plate 202. The actuator 258 can threadingly engage the upstanding portion 260 so that it can be longitudinally positioned in order to preload the transducer 212.

The edgewise placement of the data storage device 100 upon the fixturing plate 202 transfers vibration into the fixturing plate 202 that lies in a direction that is transverse to the plane in which the discs 108 rotate. Translation of the data storage device 100, and hence the fixturing plate 202, due to vibrations along this direction is denoted by arrow 262. Translation of the discs 108 and the read/write heads 112 along direction 262 are of particular interest because it can adversely affect the operable fly height of the head 120. It will be noted that the transducer 212 is positioned in parallel with the direction 262 in order to measure the vibration in that direction. Although not shown, additional transducers 212 can be placed between the fixturing plate 202 and the base plate 250 to measure vibration along other desired directions.

Figure 4:
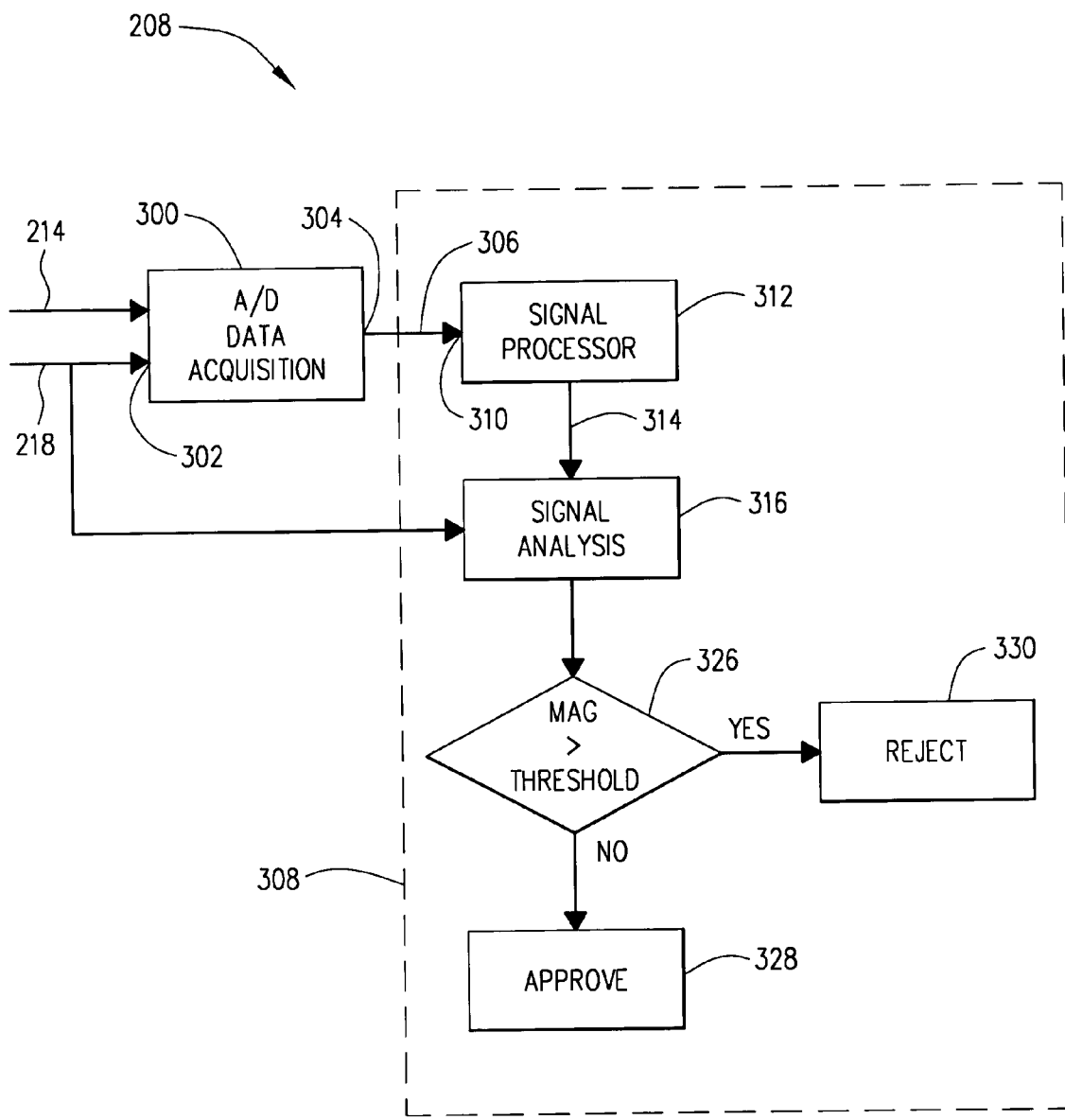
FIG. 4 is a block diagram of the imbalance detect circuit of the balancer device of FIG. 2.

Referring momentarily back to FIG. 2, the imbalance detection circuit 208 is illustrated in accordance with the embodiments of the present invention by the block diagram of FIG. 4. An analog-to-digital data acquisition card 300 has an input 302 connected to the signal 214 (FIG. 2) from the transducer 212 (FIG. 2). The data acquisition card 300 is triggered by the signal 218 (FIG. 2) when the timing sensor 216 (FIG. 2) detects rotation of the discs 108. The data acquisition card 300 samples and digitizes the analog signal 214 (FIG. 2) and at an output 304 produces a time domain digital signal 306 that is proportional to the vibration.

The imbalance detection circuit 208 further comprises digital signal processing means 308 comprising a signal processor 312 having an input 310 connected to the signal 306 from the data acquisition card 300. The signal processor 312 translates the time domain digital signal 306 to a frequency domain digital signal 314. In an illustrative embodiment the signal processor 312 employs Fourier transform analysis in performing the translation.

The signal processing means 308 further comprises signal analysis means 316 receiving the frequency domain digital signal 314 and determining the magnitude and phase of the vibration signal at a frequency associated with the instantaneous speed of the disc 108, the instantaneous speed being provided by the timing sensor signal 218. FIG. 5 is a graphical representation of the frequency domain digital signal 314, having constituent phase graph 320 and corresponding amplitude graph 322 plotted against the frequency spectrum. A vertical intercept 324 is calculated by the signal analysis means 316 at the frequency associated with the instantaneous speed of the discs 108. At block 326 (FIG. 4) it is determined whether the amplitude 328 at the intercept 324 exceeds a predetermined threshold. If the amplitude exceeds the threshold, then a reject signal 330 notifies the controller 204 (FIG. 2) that retesting or rework is required. Rework may include balancing the disc stack. It will be noted the phase 332 at the intercept 324 is useful to the balancing operation in orienting any offsetting mass. If the amplitude does not exceed the threshold, then an approved signal 328 notifies the controller 204 (FIG. 2) that the vibration is within operational tolerances and the data storage device 100 is approved for further downstream processing.

Because the imbalance detection circuit 208 is responsive to the timing sensor signal 218, transient vibration measurements can be taken during spindle motor 106 acceleration. That is, the instantaneous speed used in determining the vibration amplitude can be less than the operational speed of the spindle motor 106. This reduces the amount of station time that must be budgeted for vibration testing. This also makes it more possible to perform two or more balance tests during the station time if, for instance, a retest is necessary.

Erroneous vibration readings are discarded by filtering the frequency domain signal 314 so as to only consider a relatively small bandwidth 340 (FIG. 5) enveloping the intercept 324. Accordingly, other activities occurring simultaneously with vibration testing, such as shuttling and clamping the data storage device 100, are not included in the vibration analysis if those vibrations lie outside the preselected bandwidth 340 of consideration.

The foregoing discussion primarily involves a static imbalance analysis wherein one transducer is employed, such as the transducer 212 of FIG. 3. The magnitude and phase determined from the FFT is proportional to the actual drive imbalance condition. In order to calculate the actual imbalance condition, a magnitude scaling factor and a phase angle offset must be applied. These are determined by calibrating the balancer.

To calibrate the balancer, first a calibration data storage device 100 is measured and the results are recorded. A known weight is then applied at a known radius and angle. The calibration data storage device 100 is then measured again and the change in imbalance is calculated. The change in imbalance condition must be equal to the calibration weight and its applied angle. In order to reach this equivalency, the appropriate scaling factor and angle offset are calculated and stored by the controller 204. These calibration factors are subsequently applied in converting FFT magnitude and phase measurements to units of static imbalance magnitude and angle.

This calibration procedure can be extended in principle to a dynamic balance system where two or more transducers 212 are employed. The signals from the transducers 212 are individually acquired and translated to a frequency domain signal as above. Unlike a static balance system, however, the measurements are not necessarily taken at a plane coincident with the preferred balance correction plane. Rather, the offsetting weights of known mass and angle are empirically positioned to find the correction planes whereat the vibration at the measurement planes is minimized.

It is to be understood that even though numerous characteristics and advantages of various embodiments of the present invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the vibration detection and analysis members may vary while maintaining substantially the same functionality without departing from the scope and spirit of the present invention. In addition, although the preferred embodiment described herein is directed to use with a moving disc data storage device, it will be appreciated by those skilled in the art that the teachings of the present invention can be applied to other work pieces as well without departing from the scope and spirit of the present invention.

What is claimed is:

1. A device for measuring vibration in an article having a rotating member, the device comprising:
    a motion sensitive transducer attachable to the article comprising an output producing a time domain analog signal in response to the vibration;
    an analog-to-digital data acquisition member comprising an input connected to the transducer output for sampling the transducer signal and comprising an output producing a time domain digital signal from the sampling;
    an optic sensor, responsive to a target feature on the rotating member, adapted to detect an instantaneous speed of the rotating member and trigger the data acquisition member to begin sampling when the rotating member is rotating; and
    a processor comprising an input connected to the data acquisition member output for translating the time domain digital signal to a frequency domain digital signal and determining the magnitude and phase of said frequency domain digital signal at a frequency associated with the instantaneous speed of the rotating member.

2. The device of claim 1 wherein the processor further determines whether said magnitude of the frequency domain digital signal greater than a preselected threshold.

3. The device of claim 1 wherein the instantaneous speed is associated with a transient start up state of the rotating member and is less than an operating speed of the rotating member.

4. The device of claim 1 comprising two transducers producing simultaneous vibration signals from different planes.

5. The device of claim 4 wherein the transducers are positioned orthogonally.

6. The device of claim 1 wherein the processor performs a Fourier transform in translating the digital signal from a time domain to a frequency domain.

7. A device comprising:
    a piezoelectric transducer which produces an analog signal in response to mechanical vibration of said transducer induced by a member rotated at an instantaneous speed less than an operational speed of said member;
    an analog-to-digital data acquisition member which samples the analog signal to produce a corresponding digital signal therefrom;
    a second transducer which detects said instantaneous speed of the rotating member; and
    a processor which processes the digital signal in relation to a frequency associated with said instantaneous speed.

8. The device of claim 7 wherein the second transducer comprises an optic sensor responsive to a target feature of the rotating member, and wherein the optic sensor is adapted to trigger the data acquisition member to begin sampling when the rotating member is rotating.

9. The device of claim 7 wherein the processor further determines whether a magnitude of the digital signal at a frequency associated with the instantaneous speed of the rotating member is greater than a preselected threshold.

10. The device of claim 7 wherein the piezoelectric transducer is characterized as a first transducer which produces a first analog signal along a first plane, wherein the device further comprises a third transducer that produces a second analog signal along a second plane, and wherein the analog-to-digital acquisition device samples the first and second analog signals.

11. The device of claim 10 wherein the first and third transducers are positioned orthogonally.

12. The device of claim 7 wherein the processor further translates the digital signal to a frequency domain digital signal and determines the magnitude and phase of the frequency domain digital signal at a frequency associated with the instantaneous speed of the rotating member.

13. The device of claim 12 wherein the processor reduces erroneous vibration readings by filtering the frequency domain signal.

14. The device of claim 7 wherein the rotating member is a data storage surface for a data storage device having an associated data transducer to transduce stored data from said surface, and wherein the instantaneous speed is a speed below which the data transducer can successfully transduce said stored data.

15. The device of claim 7 wherein the rotating member comprises a magnetic storage disc.

* * * * *